July 23, 1957 A. KUTSCHA 2,800,237
SELF-LOADING AND UNLOADING REFUSE VEHICLE BODY
Filed May 6, 1954 4 Sheets-Sheet 1
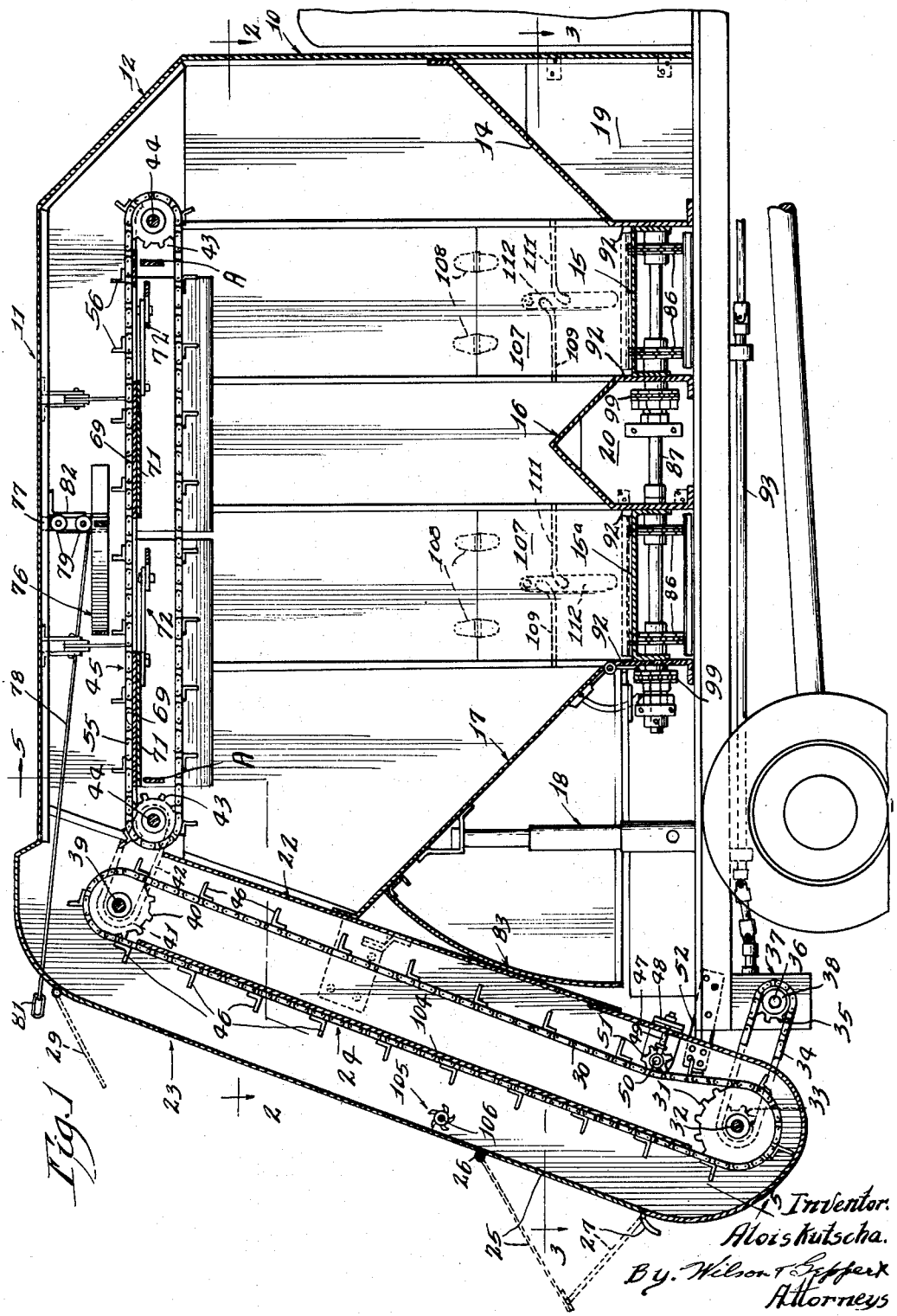

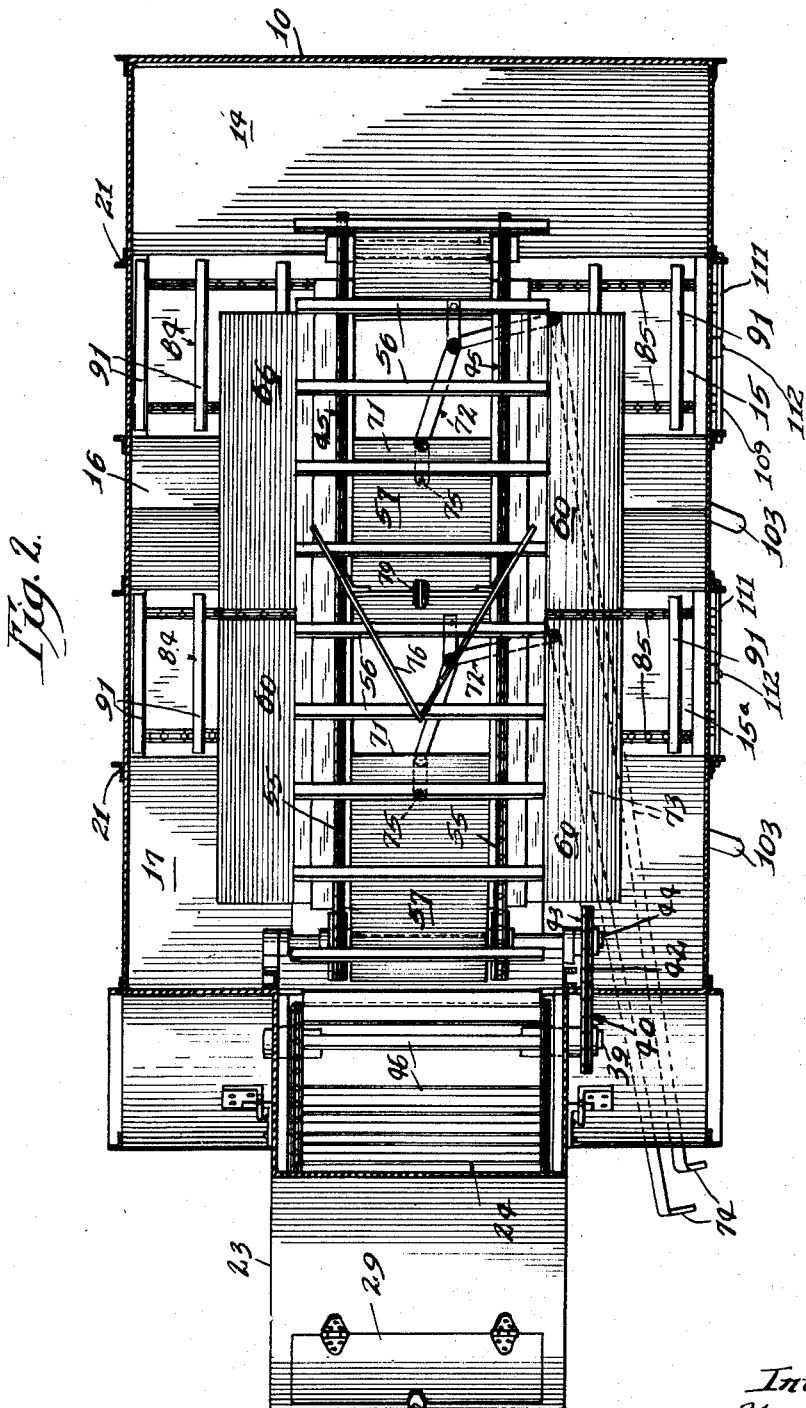

July 23, 1957  A. KUTSCHA  2,800,237
SELF-LOADING AND UNLOADING REFUSE VEHICLE BODY
Filed May 6, 1954  4 Sheets-Sheet 3
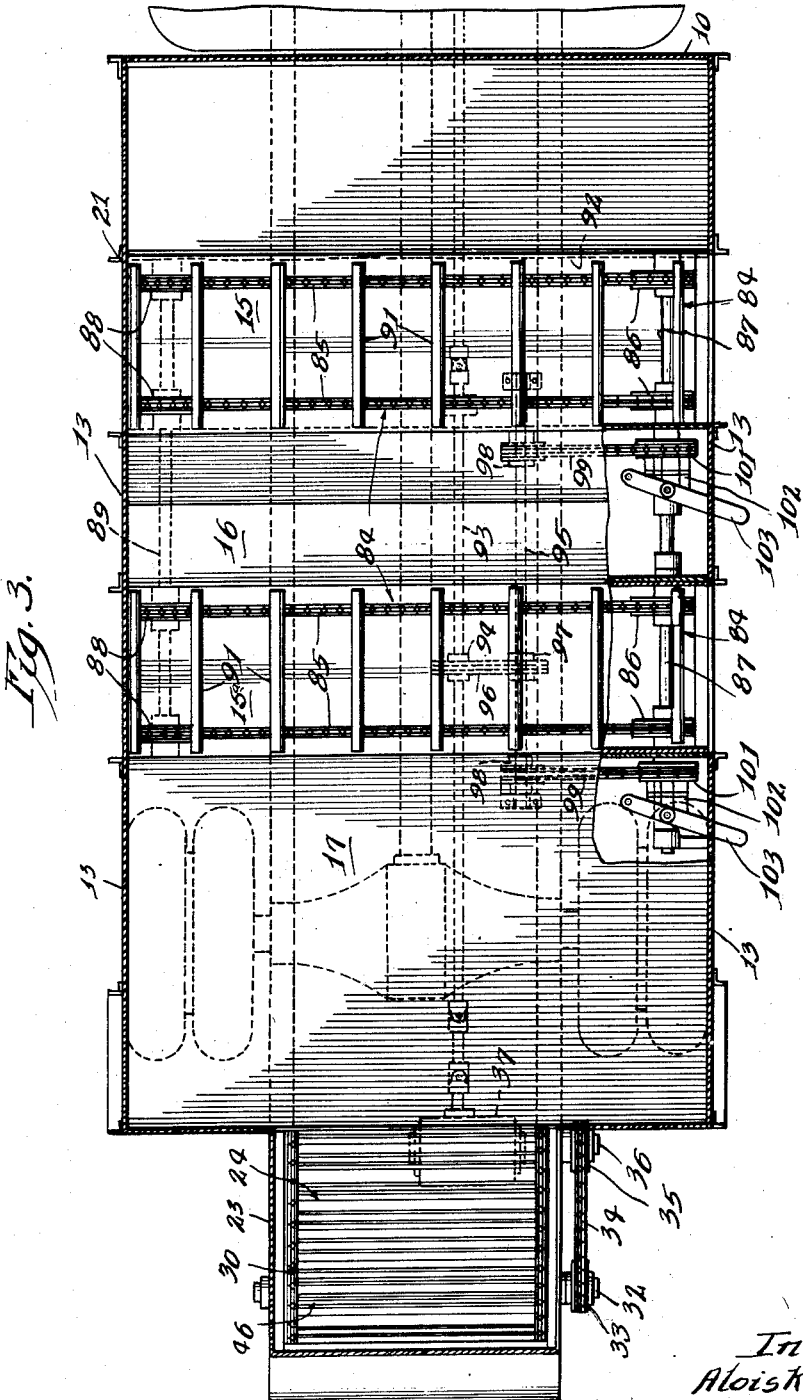

July 23, 1957  A. KUTSCHA  2,800,237
SELF-LOADING AND UNLOADING REFUSE VEHICLE BODY
Filed May 6, 1954  4 Sheets-Sheet 4
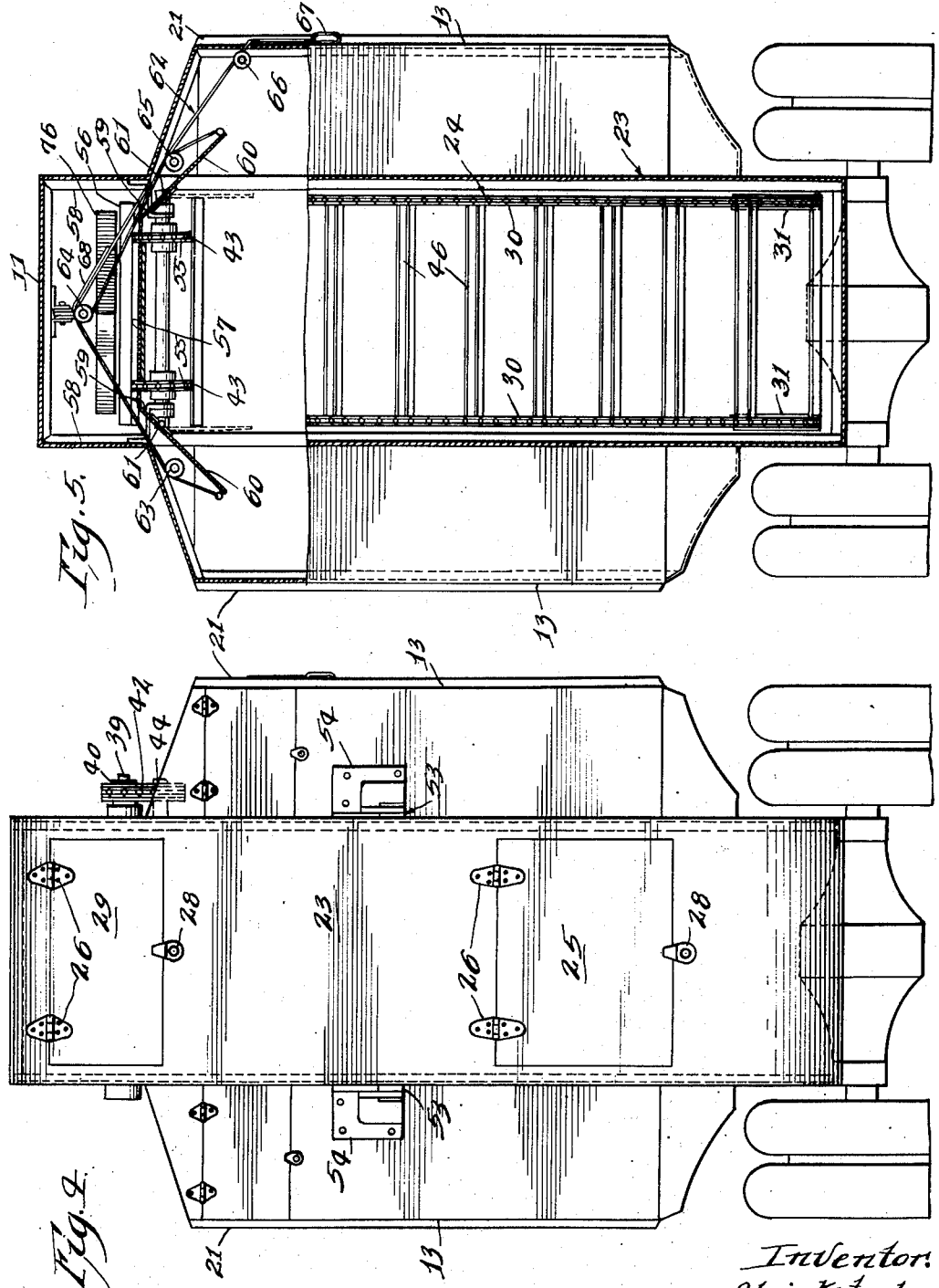

United States Patent Office 2,800,237
Patented July 23, 1957

2,800,237

SELF-LOADING AND UNLOADING REFUSE VEHICLE BODY

Alois Kutscha, Woodstock, Ill.

Application May 6, 1954, Serial No. 427,982

20 Claims. (Cl. 214—522)

The present invention relates to a novel body construction and assembly particularly adapted for the collection of refuse, including ashes, garbage, trash, etc., and in which such refuse is handled by a novel conveyor system, and means and manner of discharging and transporting the collected refuse in the body in which most effective use is made of the available space.

The present invention further provides novel means and mechanism for distributing and packing the collected refuse in the scavenger body, including a conveyor system at the rear of the body for initially receiving the refuse and transporting and discharging this refuse into the upper portion of the body where it is discharged upon a longitudinally movable conveyor system from which the refuse is directed, guided and discharged into various portions of the body under the control of the operator.

The present invention further comprehends a novel conveyor system for automatically discharging the collected refuse from the body upon the dumping ground or other place selected for ultimately receiving this refuse.

Another and important object of the present invention is the provision of a novel means and manner of driving a system of conveyors from a suitable power take-off on the truck, this drive being such that the loading conveyor at the rear of the scavenger body and the distributing conveyor in the upper portion of the scavenger body are operated simultaneously and synchronously, whereas plural unloading conveyors are operated separately to most effectively discharge the contents of the scavenger body. In the novel disclosed embodiment, power is transmitted through a speed reducer to the loading conveyor and from this loading conveyor to the distributing conveyor, and a counter-shaft is provided for receiving power from the power take-off for driving either of the unloading conveyors.

The invention further comprehends a novel means and manner of distributing the refuse in the scavenger body, including a novel conveyor system whereby the collected material is fed or carried by the flights of a conveyor longitudinally of the body and simultaneously these flights direct and project the collected material laterally over the sides thereof and over downwardly inclined panels that are adjustable by the operator to direct and control the discharge of the material into different locations in the body whereby to most effectively make use of all available space therein.

This novel conveyor system further comprehends a novel adjustable panel arrangement for the distributing conveyor whereby the material carried by this conveyor is adapted to be directed and discharged vertically from between adjacent flights and into the central portion of the body, whereby the operator is assured complete control and can accurately and positively direct the refuse to any portion of the body to make full use of its ultimate capacity.

Another important feature of the present invention is the provision of a V-shaped guide or deflector movable into and out of operative position above the flights and substantially central portion of the distributing conveyor, and when in operative position will direct and deflect and discharge any bulky material projecting above these flights to the opposite sides and rear of the body. The deflected material is discharged onto the downwardly inclined and adjustable panels or wings and is directed to the opposite sides of the body where it will collect and this collected material compacted into a minimum of space. The operator by lowering or adjusting the downward inclination of such panels or wings may direct the material collected from the opposite sides and then inwardly to fill up any available space in the center of the body. Thus the operator is capable of accurate and positive control of the material collected on the distributing conveyor, and as the material is being collected can quickly adjust as he sees fit the inclined panels or wings at the sides of this conveyor, as well as the V-shaped deflector thereabove and slidable panels of the table therebelow over which the distributing conveyor moves and carries its load. These sliding panels are particularly useful in the collection of ashes or refuse of a similar nature.

Another and important feature of the present invention is the provision in the floor or base of the scavenging body of a tiltable floor section which may be raised or lowered and when raised will compress and compact the material collected so as to make further effective use of all available space within the body.

As the present invention comprehends the handling of all types of refuse including cardboard or other boxes or relatively bulky articles that might be discarded and collected, there is provided in association with the loading conveyor a novel means and manner of crushing such boxes as they are being conveyed or elevated into position for discharge on the distributing conveyor and thus prevent jamming or clogging. Such means is preferably in the form of one or more toothed wheels mounted upon a stub shaft that may be journalled in the opposite sides of the housing for the loading conveyor and freely rotatable so that as these boxes or other bulky articles are being lifted by the flights of the loading conveyor they will be engaged and crushed by these toothed wheels. Such a toothed wheel may be a continuous member extending across the loading conveyor or it may consist of multiple wheels suitably spaced apart.

Another important object of the present invention is to provide a novel system of conveyors for a scavenging truck body for discharging the material collected in the body of the truck. These include spaced conveyors which are individually driven and connected to a power source by suitable clutch mechanism enclosed within the body and accessible by a conveniently operated door or closure so that when the contents of the body is to be dumped these doors are opened, and by engaging the clutch of one or the other of these conveying systems the material disposed adjacent to such conveyor will be carried from the interior of the body and discharged upon the ground or other available dump space.

These novel conveyors are disposed transverse of the scavenger body and so arranged that the forward conveyor discharges the material collected in the forward portion of the truck body to one side of the body, and after such material has been discharged and the body thereat cleared, the operator disconnects the forward conveyor and connects the rear discharge conveyor whereby the material collected in the rear portion of the truck adjacent this conveyor is discharged at one side of the body.

To facilitate complete clearing of the interior of the body, the novel scavenger body is so constructed that the floor at the front thereof is inclined and with the rear of the floor provided with an inclined but tiltable section, and an inclined transverse divider or partition between the conveyors, all material collected within the body is directed to one or the other of the discharge conveyors from the respective ends of the body so that the body may be completely cleared of any collected material.

To facilitate access to the interior of the body and to the loading conveyor system at the rear of the body, in the present invention provision has been made for ready access thereto. For the upwardly inclined loading conveyor at the rear of the body there is provided a removable hood or enclosure that may be readily lifted off or removed and thus give complete access to this end. In addition, this loading conveyor is made bodily removable to facilitate assembly, disassembly, repair or cleaning as required.

The present novel invention further comprehends providing doors or enclosures at each side of the conveyor body which when raised or opened permit easy access to the interior. As shown in Fig. 1, the loading conveyor housing is provided with a door or closure that is retained in open position by a sliding brace or linkage arrangement to allow the operator to readily and conveniently load refuse into the space provided therefor and onto the loading conveyor. Additional doors or closures are provided at various accessible locations to permit the operator to observe and control the loading operation and to permit access for repairs or adjustments, when necessary.

Each conveyor consists of spaced chains operated through suitable sprockets and with these chains supporting spaced transverse flights capable of carrying the refuse regardless of its physical characteristics. The flights on the loading conveyor extend between the chains to permit adjustment of the chains and those on the distributing conveyor preferably extend beyond the sides of the chains whereby to direct the material over the sides and downwardly over the inclined panels at each side of the conveyor.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in side elevation of the scavenger body with portions of the adjacent side wall removed or broken away to more clearly disclose the mechanism within the body of the truck.

Fig. 2 is a view in horizontal cross section taken on the irregular line 2—2 of Fig. 1 and viewed in the direction of the arrows, the view showing in top plan the arrangement of the loading and distributing conveyors, the V-shaped deflector disposed above the distributing conveyor and the inclined panels extending downwardly therefrom for directing and distributing the material to the opposite sides of the body.

Fig. 3 is a view in horizontal cross section taken in a plane substantially on the line 3—3 of Fig. 1 and viewed in the direction of the arrows, but showing a top plan view of the inclined floor sections.

Fig. 4 is a view in rear elevation of the body and showing the loading end thereof.

Fig. 5 is a view in vertical cross section taken on the irregular line 5—5 of Fig. 1 and viewed in the direction of the arrows.

Referring more particularly to the disclosure in the drawings and to the novel illustrative embodiment therein shown, the present invention comprises an enclosed scavenger body susceptible of maximum convenience, accessibility and most effective loading of refuse of all types or kinds and the ready and convenient discharge of such refuse at the dumping ground. The novel scavenger body is provided with a front wall 10, a top 11 that merges with the front wall through an inclined portion 12, and side walls 13. The bottom base or floor of the body comprises an inclined portion 14, depressed or recessed unloading platforms 15 and 15$^a$ disposed in spaced relation and divided by an inclined dividing wall 16 having its opposite sides inclined at a downward inclination of approximately 45° to direct and facilitate removal of the collected material toward the unloading conveyors.

At the rear the bottom or floor is provided with a tiltable section 17 which may be moved from a lowered position in which it is located in a substantially horizontal plane to a downward inclination of approximately 45° when in raised position as shown in Fig. 1. Such raising and lowering is preferably accomplished by means of telescoping, hydraulic lift 18 which may be manually actuated or controlled. Beneath the inclined floor portion 14 at the front of the body and the V-shaped inclined divider 16 is provided space for the reception of bulky material which could not be adequately handled by the conveyor. Each space is provided with a door or closure 19 and 20 that permits ready access by the operator. Such a door or closure 19 may be provided at either or both sides of the body to facilitate removal of the contents, but preferably the door or closure 20 for access beneath the divider 16 is provided at the side opposite the location of the drive and clutch mechanism for the unloading conveyors.

The body is rigidly supported by suitably spaced brace members referred to generally by the reference character 21. At the rear of the body there is provided an inclined wall 22 which provides the rear wall with a removable housing 23 for enclosing a loading conveyor system 24. This housing at the extreme rear is provided with a door or closure 25 hinged at its upper end at 26 and adapted to be retained in elevated position by any suitable link or brace arrangement 27 which when extended holds the door in elevated position. When the door is closed it may be locked in such closed position by a suitable catch 28. Another door or closure 29 is provided adjacent the upper end of this housing 23 to permit the operator to inspect the operation of the loading. It like the lower door or closure 25 is preferably hingedly mounted at its upper end, and when in lowered or closed position is held by means of a suitable catch.

Mounted within the housing 23 is the loading conveyor system 24 consisting of spaced articulated chains 30 driven by means of a drive sprocket 31 having its hub keyed or fixed to one end of a transverse shaft 32 journalled in the opposite sides of the housing 23, this projecting end of the shaft also carrying a smaller sprocket wheel 33 driven by a chain 34 from a sprocket wheel 35 keyed or fixed to one end of a drive shaft 36 projecting from one end of a reducer in a housing 37. This projecting end of the shaft 36 is shown (Figs. 2 and 3) journalled in a bearing 38 provided at the exterior of the housing. Adjacent the upper end of the housing is a driven shaft 39 which also has its opposite ends journalled in bearings in the opposite sides of the housing 23, and like the drive shaft 32 this driven shaft is provided at its opposite ends at the exterior of the housing with a sprocket wheel 40 and a smaller sprocket wheel 41 for driving a chain 42, this chain in turn driving a sprocket wheel 43 mounted on one end of a transverse shaft 44 for driving a distributing conveyor system 45 in the upper portion of the scavenger body.

Each of the spaced conveyor chains 30 of the upwardly inclined loading conveyor system 24 carries one end of a plurality of suitably spaced flights 46 of approximately L-shape in cross section. These flights are preferably connected by a bracket to the inner side of the articulated or joined links of the chains 30 whereby to prevent any injacent inclined side of the transverse divider 16 and the tiltably mounted section 17 of the floor.

Each platform or table is provided with a discharge or unloading conveyor 84 comprising spaced chains 85 operated by spaced drive sprockets 86 each having its hub pinned or keyed to a drive shaft 87 journalled in spaced supports in the scavenger body, and with each chain driving a sprocket 88 having its hub pinned or keyed to a driven shaft 89 suitably journalled in the scavenger body. Each conveyor has spaced flights 91 mounted on the chains 85 with the ends of these flights extending beyond the sides of the chains and to approximately the walls or sides 92 which together with the platforms or tables 15 and 15$^a$ define the well or hopper into which the collected refuse is directed by the sloping or inclined sides of the bottom portions 14, 16 and 17.

To operate the conveyor systems for loading, distributing and unloading, Figs. 1 and 3 disclose a power take-off shaft 93 disposed beneath the body of the truck. This power take-off shaft continues to the rear of the truck body where it is connected to and drives the drive shaft 36 through a speed reducer enclosed within the casing or housing 37 for reducing the speed of operation of this transverse drive shaft 36. Also mounted on the power take-off shaft 93 adjacent one of the transverse unloading or discharging conveyors 84 is keyed or fixedly mounted the hub of a sprocket wheel 94 for driving a driven shaft 95, shown arranged parallel to the power take-off shaft 93, through a chain 96 and sprocket wheel 97. On this parallel driven shaft 95 are keyed or pinned the hubs of a pair of spaced sprocket wheels 98, each adapted to drive through a suitable chain drive 99 a pair of spaced sprocket wheels 101 mounted on the drive shaft 87. Each sprocket wheel 101 is free to rotate upon the shaft 87 but is adapted to be clutched thereto by a suitable clutch member 102 operated by a clutch arm or operating handle 103 for moving the clutch face of each clutch member into tight clutching engagement with a complementary clutch face on the adjacent sprocket wheel 101. Each clutch is separately actuated by its operating handle 103 so that either of the unloading or discharging conveyors 84 may be operated, as desired. The power take-off may be operated from the truck cab in the usual manner.

To prevent clogging of the loading conveyor 24 or the space between its flights 46 and the underlying plate 104 over which the flights move (Fig. 1) and the interior of the housing 23, there is provided one or more toothed wheels 105 disposed on a transverse shaft 106 freely journalled and rotatable in the opposite sides or spaced walls of housing 23. Thus as the conveyor flights 46 elevate and carry such boxes or objects upwardly, such boxes or objects engage the toothed wheel or wheels 105 and are crushed thereby so that they may pass along with the flights.

From the above description and the disclosure in the drawings, it will be evident that the present invention comprehends a novel scavenger body having a novel system of conveyors and deflecting means so constructed and arranged as to most effectively and conveniently collect and distribute the collected material in the scavenger body whereby to make most effective use of all available space within the body and to most effectively discharge and unload the contents at the dumping ground. Any collected material or refuse that is too large or bulky to be handled by the loading conveyor may be conveniently inserted into the laterally opening spaces beneath the inclined floor or bottom section 14 and beneath the divider 16, ready access being afforded to these spaces by the hinged doors or closures 19 and 20. However, many boxes or relatively bulky packages or articles may be loaded and, if relatively large, will be crushed by the toothed wheel or wheels to permit their continued passage with the flights 46 of the loading conveyor.

Each of the unloading platforms 15 and 15$^a$ is enclosed by a door or closure 107 pivotally mounted at 108 at one or both sides of the scavenger body. Suitable latch mechanism having alternately projecting latch members 109 and 111 adapted to be retracted from latching engagement or moved into latching engagement is adapted to be operated by means of a handle 112. Thus when unloading the collected refuse, either or both doors or closures 107 may be opened and held in open position.

Having thus disclosed the invention, I claim:

1. In a scavenger body for collecting refuse including an enclosure in which the refuse is collected and compacted for subsequent discharge, conveying means in the upper portion of and extending longitudinally of said enclosure for receiving and distributing the collected refuse in said enclosure, said enclosure having a floor provided at its opposite ends with an inclined portion with one of said inclined portions being stationary and the other inclined portion being tiltable for compacting the collected refuse, an inclined divider extending transversely across the floor of the body intermediate but spaced from said inclined floor sections to provide a hopper at each side of said divider from which the collected refuse is unloaded, and a discharge conveyor in the lower end of each hopper for discharging the collected refuse at one side of the enclosure.

2. In a scavenger body for collecting refuse including an enclosure in which the refuse is collected and compacted for subsequent discharge, conveying means in the upper portion of and extending longitudinally of said enclosure for receiving and distributing the collected refuse in said enclosure, said enclosure having a floor divided transversely and provided at its opposite ends with an inclined portion with one of said inclined portions being stationary and the other inclined portion being tiltable from a substantially horizontal to an elevated and downwardly inclined position for compacting and directing the collected refuse downwardly and inwardly therefrom, an inclined divider extending transversely across the floor of the body intermediate said inclined floor sections but spaced therefrom, each of said floor sections being inclined toward the adjacent side of the divider for directing the collected refuse inwardly toward the central portion of the body and toward said divider, and conveying means extending parallel to said divider and disposed adjacent the lower end of each inclined floor section and between a floor section and the adjacent side of the divider for discharging the refuse collected thereat and directed thereto by the inclined sides of the divider and the inclined floor sections.

3. In a scavenger body for collecting refuse including an enclosure in which the refuse is collected and compacted for subsequent discharge, an overhead conveyor in said enclosure for receiving and transporting the refuse longitudinally of the enclosure, means associated with said conveyor for distributing the refuse transported by said conveyor, said enclosure having a floor provided at its opposite ends with an inclined section with one of said inclined sections being stationary and the other inclined section being movable from a substantially horizontal position to a position in which one end is elevated to incline this section downwardly and inwardly for compacting the collected refuse, a divider extending laterally of the floor of the body with its opposite sides inclined downwardly toward but spaced from a floor section to provide a hopper bottom for receiving the refuse collected in the body, and a conveyor in each hopper bottom and operable laterally of the body for discharging the contents of the body at one side thereof.

4. In a scavenger body for collecting ashes, garbage and other refuse, said body having a top, bottom, front, rear and side walls providing an enclosure for the collected refuse, conveying means at the rear of the body for collecting and elevating the collected refuse to the upper portion of the body, other conveying means adjaterference with the take-up on the chains for which provision is made. Each take-up is shown as mounted on a transverse base 47 and consists of a bracket or support 48 and an adjusting screw 49 having one end bearing against and journalled to a stub or transverse shaft 50 carrying an idler sprocket 51 engaging the chain.

To detachably anchor the housing 23 in place there is provided a bracket 52 at each side of the housing (Fig. 1) which is detachably mounted by suitable bolts or other attaching means to the frame or the chassis of the truck body. Thus by removing these bolts the housing may be readily lifted off. To further detachably support the housing 23 upon the rear wall 22 of the scavenger body, there is secured (Fig. 4) to each side of the housing intermediate its length a bracket member 53 having a laterally projecting wing adapted to be slidably mounted in the wing of a complementary bracket 54 rigidly secured to the rear wall 22. Upon removing the bolts by which the housing is secured to the frame or chassis of the truck through the brackets 52 it will be readily seen that the entire housing may be lifted sufficiently to disengage the wings on the complementary brackets 53 and 54 and thus permit the housing to be completely disengaged and removed.

The distributing conveyor system 45 arranged in the upper portion of the truck body is mounted on transverse supports A affixed or secured to the opposite sides of the body and provided with spaced chains 55 on the rotatable sprockets 43 having articulated links to which are attached at suitably spaced distances flights 56 each secured or attached inwardly of its opposite ends to the links by means of oppositely projecting ears or brackets. As shown in Figs. 2 and 5, the ends of the flights extend a substantial distance beyond the chains and their supporting brackets in order to direct the material being carried not only longitudinally of the distributing conveyor but also transversely thereof where this material is directed into the space between the opposite edges of a floor support 57 and the opposite side walls 58 of the body. As shown more clearly in Fig. 5, this space permits the material to drop between the ends of the flights onto an inclined ledge 59 at each side of the floor support 57 for the distributing conveyor and then onto an inclined shelf, panel or wing 60 which in its normal position is aligned with the inclined shelf, panel or wing.

As shown in Fig. 2, each shelf, panel or wing 60 is pivotally mounted at 61 and at its outer or free end is connected by a cable 62 passing over a series of pulleys 63, 64, 65 and 66, with the end of the cable actuated and manually controlled by a handle 67 accessible to the operator. More particularly, the cable is shown as consisting of two parts passing over a double pulley 64 and secured together by a clip or the like 68 so that the operator may pull the handle 67 and operate the panels or wings 60 at the opposite sides of the conveyor simultaneously.

The floor support 57 comprises spaced fixed panels 69 and slidable or movable panels 71, the latter being each connected by a system of links 72 to an arm 73 extending to the rear of the body and thereat provided with a handle or knob 74 adapted to be conveniently grasped by the operator to move either slidable panel 71 to open or closed position. As shown in Fig. 2, the slidable panels are both moved to open position, but as they are operated by separate handles it is contemplated that they be separately moved to fully open, fully closed or to any intermediate position. Each linkage system is attached to the underside of a slidable or movable panel 71 at 75 so that as the handle is moved in one direction the sliding panel is caused to move to closed position, and when moved in the other direction the sliding panel is moved to the open position as shown in Fig. 2.

Supported above the chains and flights thereon is provided a substantially V-shape deflector 76 (Figs. 1 and 2) depending from a bracket arm 77 which is pivotally mounted upon and depending and supported from the top or roof 11 of the scavenger body. A cable 78 passing over one or more pulleys 79 and provided with a handle 81 extending to the exterior and rear of the body permits the operator to withdraw or lift this deflector about its pivotal mounting by pulling on the cable and thus moving the deflector upwardly sufficient to move and position it out of the path of the flow of material carried by the conveyor system 45. When it is in its lowered position, it just clears the flights 56 to permit their uninterrupted travel but in position to deflect any large articles or objects projecting above the flights outwardly and laterally and onto the inclined ledge 59 of the floor support 57, onto the side panels or wings 60 from which these deflected articles or objects drop into the scavenger body in the approximate rear half thereof. To prevent the deflector 76 from being displaced or moved rearwardly from the position shown in Fig. 1, there is provided a depending angle bracket 82 which forms an abutment or stop limiting forward movement of the deflector and its support.

The openings provided in the floor 57 for the distributing conveyor system 45 upon retraction of the slidable or movable panels 71 permit the collected material to drop through the floor of the conveyor, and particularly this is of substantial advantage when collecting ashes and the like, for the operator can thereby accurately control the filling and compacting of the material within the body. Generally, in the initial loading operation these slidable panels 71 are closed to permit the filling of the opposite sides and front of the truck body. Next the deflector 76 is lowered to its operative position as shown in Fig. 1 so as to deflect and prevent any relatively large or bulky material projecting above the flights 56 from being conveyed to the front of the scavenger body to thereby control the filling of the body from approximately the center to the rear thereof, after which the slidable panels 71 are moved to open position to permit material to drop into the central portion of the body and thereat fill any available space.

It should be mentioned that in the initial loading of the body the tiltable floor panel 17 is preferably moved to its lowered or substantially horizontal position guided by the arcuate wall 83 at the rear thereof, and that after the slidable panels 71 have been opened to permit the central portion of the body to be filled, this tiltable floor panel 17 is elevated to the raised position shown in Fig. 1 by the telescoping sections of the hydraulic lift 18 whereby to compact the material collected and make space available for additional material. By this construction and arrangement, the operator is enabled to make most effective use of all available space in the body.

During the loading operation, any long or bulky objects which could not be handled by the loading and distributing conveyor systems may be inserted into the space provided in the body to which access may be had through the hinged doors or closures 19 and 20. Such openings may be provided with a door or closure at one or both sides, as desired, but preferably the material loaded into the space beneath the divider 16 is entered and removed from the side appearing at the top of Fig. 3, so as not to interfere with the control or operation of the power drive for the unloading conveyors.

Each of the unloading platforms or tables 15 and 15a is disposed at a lower elevation or level than the adjacent portions of the scavenger body. As disclosed in Fig. 1, the platform or table 15 provides a well or hopper to which the collected material adjacent the front of the body is directed by the inclined forward end or portion 14 of the floor and the adjacent inclined side of the divider 16 which divides the floor or bottom of the scavenger body transversely. The platform or table 15a provides a well or hopper to which the collected material at the rear of the scavenger body is directed by the adcent the top and longitudinally of the body intermediate its side walls for receiving and distributing the refuse discharged from the upper portion of the first mentioned collecting means into the body at different locations beneath the same, unloading conveying means extending transversely in the bottom of the body for discharging the collected refuse from the body, inclined sections in the bottom of the body at the front and rear thereof for compacting and directing the collected refuse to the unloading conveying means in the bottom, and an inclined divider extending transversely across the bottom of the body intermediate said inclined sections with each of said inclined bottom sections directing the collected refuse to the unloading conveying means.

5. In a scavenger body for collecting ashes, garbage and other refuse having a top, bottom, front, rear and side walls providing an enclosure for receiving the collected refuse, conveying means at the rear of the body for collecting and elevating the collected refuse to the upper portion of the body, a distributing conveyor extending adjacent the top and longitudinally of the body at approximately the center thereof for receiving and provided with spaced flights for carrying and distributing the material discharged from the upper portion of said collecting means into the body at different locations, a deflector adjustably mounted above said distributing conveyor for deflecting any material projecting above said distributing conveyor to the opposite sides thereof, and spaced conveyors in the bottom of body for unloading and discharging the collected refuse from the body.

6. In a scavenger body for collecting ashes, garbage and other refuse, said body having a top, bottom, front, rear and side walls providing an enclosure for the collected refuse, conveying means at the rear of the body for collecting and elevating the collected refuse to the upper portion of the body, means for receiving and distributing the refuse discharged from the upper portion of the collecting means into the body at different locations, unloading conveying means in the bottom of body for discharging the collected refuse from the body and inclined sections in the bottom of the body at the front and rear thereof for compacting and directing the collected refuse to the unloading conveying means in the bottom.

7. In a scavenger body for collecting ashes, garbage and other refuse having a top, bottom, front, rear and side walls providing an enclosure, an upwardly inclined conveyor at the rear of the body having spaced flights for collecting and elevating the collected refuse to the upper portion of the body, a longitudinally extending conveyor having spaced flights for receiving and distributing the refuse discharged from the upper portion of said collecting means into the body, the front and sides, a deflector adjustably mounted above said distributing conveyor for deflecting any refuse projecting above its flights to the opposite sides of the body, outwardly and downwardly inclined panels at the opposite sides of the distributing conveyor for receiving and directing the refuse discharged from the opposite sides of said distributing conveyor to the opposite sides of the body, and conveying means in the bottom of the body for receiving and discharging the collected refuse from the body.

8. In a scavenger body for collecting ashes, garbage and other refuse having a top, bottom, front, rear and side walls providing an enclosure, conveying means at the rear of the body for collecting and elevating the collected refuse to the upper portion of the body, other conveying means in the upper portion of the body for receiving the refuse collected by the first mentioned conveying means and distributing this refuse to different locations in the body, a deflector adjustably mounted above said distributing conveying means for deflecting any refuse projecting above said distributing conveying means to the opposite sides thereof, and slidable panels beneath said distributing conveying means which when opened permit refuse carried by the distributing conveying means to drop therethrough into the central portion of the body.

9. In a scavenger body for collecting ashes, garbage and other refuse having a top, bottom, front, rear and side walls providing an enclosure, a collecting conveyor at the rear of the body having spaced flights for collecting and elevating the collected refuse to the upper portion of the body, a distributing conveyor having spaced flights for receiving and distributing the refuse discharged from the upper portion of the collecting conveyor into the body at different locations, a deflector adjustably mounted above said distributing conveyor for deflecting any refuse projecting above said distributing conveyor to the opposite sides thereof, pivotally mounted panels at the opposite sides of the distributing conveyor for receiving and directing refuse discharged by the flights of said distributing conveyor from the opposite sides of said conveyor to the opposite sides of the body, slidable panels beneath said distributing conveyor means which when opened permit refuse carried by the flights of the distributing conveyor to drop therethrough into the central portion of the body, and means for manually adjusting said inclined and slidable panels to direct the refuse received and carried by said distributing conveyor to fill all available space in the body.

10. In a scavenger body for collecting refuse and providing an enclosure having a top, bottom, side and end walls, an upwardly inclined loading conveyor at the rear of the body, a detachable housing for enclosing said loading conveyor provided with an opening and a closure which when opened permits the operator to conveniently load the conveyor with collected refuse, a distributing conveyor arranged within and adjacent the top of the body and extending longitudinally thereof for receiving the collected refuse from the upper end of the loading conveyor and transporting it forwardly in the body for discharge adjacent the front of the body, means associated with said distributing conveyor for directing some of the refuse carried thereby to the opposite sides of and beneath the distributing conveyor, and one or more unloading conveyors in the bottom of the body and extending transverse thereof for discharging the collected refuse from the bottom of the body at one side thereof, and means for separately controlling said loading conveyors.

11. In a scavenger body for collecting ashes, garbage and other refuse having a top, bottom, front, rear and side walls providing an enclosure, conveying means at the rear of the body for collecting and elevating the collected refuse to the upper portion of the body, conveying means in and adjacent the top of the enclosure for receiving and distributing the material discharged from the upper portion of the first mentioned collecting means into the body at different locations, conveying means in the bottom of body for discharging the collected refuse of the body, inclined sections in the bottom of the body for compacting and directing the collected refuse to the discharge conveying means in the bottom of the body, and loading compartments provided beneath said inclined sections and open through a side wall of the enclosure providing space for receiving bulky refuse.

12. In a scavenger body for collecting ashes, garbage and other refuse, said body having a top, bottom, front, rear and side walls providing an enclosure, upwardly and forwardly inclined conveying means at the rear of the body for collecting and elevating the collected refuse to the upper portion of the body, longitudinally extending conveying means for receiving and distributing the collected refuse discharged from the upper portion of the first mentioned conveying means into the body, deflecting and directing means associated with said last mentioned conveying means for discharging and directing the collected refuse longitudinally and laterally from said conveyor and at different locations in the body as it travels longitudinally thereof, and transversely extending conveying means in the bottom of the body between the front and rear walls for discharging the collected refuse of the body through a side wall thereof.

13. In a scavenger body for collecting ashes, garbage and other refuse having a top, bottom, front, rear and side walls providing an enclosure, upwardly and forwardly inclined conveying means at the rear of the body for collecting and elevating the collected refuse to the upper portion of the body, conveying means disposed beneath but adjacent the top of the body and extending longitudinally thereof for receiving and distributing the refuse discharged from the upper portion of the first mentioned conveying means into the body, deflecting and directing means associated with said last mentioned conveying means for discharging and directing the collected refuse longitudinally and laterally from said conveyor and at different locations in the body as it travels longitudinally thereof, conveying means in the bottom of the body for discharging the collected refuse from the body at one side thereof, and means in the bottom of the body at each side of said discharge conveying means for compacting and directing the collected refuse downwardly to the discharge conveying means in the bottom of the body.

14. In a scavenger body for collecting refuse including an enclosure in which the refuse is collected and compacted for subsequent discharge, an overhead conveyor in said body for receiving and distributing the refuse in said enclosure, deflecting and directing means adjacent said conveyor for discharging and directing the refuse collected on and conveyed by said conveyor to different locations in the enclosure longitudinally and laterally of said conveyor, said enclosure having a floor provided at its opposite ends with an inclined portion, one of said inclined portions being stationary and the other inclined portion being tiltable for compacting the collected refuse, and discharge conveying means between said inclined portions for discharging the collected refuse from one side of the enclosure.

15. In a scavenger body for collecting refuse including an enclosure in which the refuse is collected and compacted for subsequent discharge, an overhead conveyor in said enclosure for receiving the collected refuse, an adjustably mounted deflector above said overhead conveyor for distributing the refuse carried thereby, said enclosure having a floor divided transversely and provided at its opposite ends with an inclined portion with one of said inclined portions being stationary and the other inclined portion being tiltable for compacting the collected refuse, a divider disposed between and spaced from the lower end of said inclined floor sections to provide a hopper between each floor section and the adjacent side of the divider, and a conveyor disposed in each hopper for discharging the collected material from the hoppers to one side of the body.

16. In a scavenger body, a loading conveyor system at the rear of the body including an upwardly and forwardly inclined loading conveyor having spaced, rigid flights for receiving collected refuse and elevating and delivering such refuse to the upper portion and at the rear of the body for distribution, a housing providing an enclosure for said loading conveyor but having an opening adjacent the lower end of the conveyor for receiving the collected refuse upon said flights and elevating the collected refuse, and a freely rotatable toothed wheel mounted in the rear of said housing above said opening and adjacent to but in spaced relation with the flights for crushing any collected boxes or packages received and carried by the elevating flights and that project beyond the flights sufficiently to engage the toothed wheel before said boxes are delivered by said flights to the body.

17. In a scavenger body, an upwardly and forwardly inclined loading conveyor at the rear of the body for receiving collected refuse and elevating and delivering such refuse to the upper portion of the body for distribution, a housing providing an enclosure for said conveyor and having an opening adjacent the lower end of said housing for receiving the collected refuse, a closure for said opening, means for pivotally mounting said closure at its upper end and a freely rotatable toothed wheel in said housing and spaced from said conveyor for engaging and crushing any boxes and the like carried upwardly with the refuse before said boxes are delivered to the body and to prevent clogging of the conveyor system.

18. In a scavenger body as set forth in claim 16, including means for removably mounting said housing for access to said loading conveyor.

19. In a scavenger body as set forth in claim 17, including means for removably mounting said housing upon the rear of the body for access to the loading conveyor, and means for removably mounting said loading conveyor at the rear of said body for facilitating assembly, disassembly and repair.

20. In a scavenger body, a loading conveyor system at the rear of the body including an upwardly and forwardly inclined loading conveyor having spaced flights for receiving collected refuse and elevating and delivering such refuse to the upper portion and at the rear of the body for distribution, a housing providing an enclosure for said loading conveyor but having an opening adjacent the lower end of the conveyor for receiving the collected refuse upon said flights and elevating the collected refuse, means for removably mounting said housing upon the rear of the body for access to the loading conveyor, and means for removably mounting said loading conveyor at the rear of said body for facilitating assembly, disassembly and repair.

References Cited in the file of this patent

UNITED STATES PATENTS

| | | |
|---|---|---|
| 1,882,440 | Naylor | Oct. 11, 1932 |
| 2,151,894 | Cambessedes | Mar. 28, 1939 |
| 2,267,526 | Kutscha | Dec. 23, 1941 |
| 2,275,799 | Oklejas | Mar. 10, 1942 |
| 2,310,592 | Noble | Feb. 9, 1943 |
| 2,321,168 | Tognetti | June 8, 1943 |
| 2,394,006 | Osgood | Feb. 5, 1946 |
| 2,655,274 | Lowe et al. | Oct. 13, 1953 |